United States Patent [19]

Kendrick

[11] 4,218,080

[45] Aug. 19, 1980

[54] REPAIRABLE COMPOSITE SEAL RING

[75] Inventor: William D. Kendrick, Duncan, Okla.

[73] Assignee: Halliburton Company, Duncan, Okla.

[21] Appl. No.: 36,634

[22] Filed: May 7, 1979

Related U.S. Application Data

[63] Continuation-in-part of Ser. No. 873,180, Jan. 30, 1978, abandoned.

[51] Int. Cl.³ ............................................. F16L 19/02
[52] U.S. Cl. .................................... 285/347; 277/225;
    277/181; 285/367; 285/379; 285/16
[58] Field of Search ................. 285/367, 379, 347, 15,
    285/16, 334.1, 334.2, 370, 371, 383; 277/225,
    235, 166, 181–186, 188 R, 189

[56] References Cited

U.S. PATENT DOCUMENTS

| | | | |
|---|---|---|---|
| 2,075,427 | 3/1937 | Church | 285/379 X |
| 2,750,210 | 6/1956 | Trogdon et al. | 285/347 X |
| 3,554,581 | 1/1971 | Mason et al. | 285/367 |

FOREIGN PATENT DOCUMENTS 6805559 10/1968 Netherlands ............................ 285/379

*Primary Examiner*—Dave W. Arola

*Attorney, Agent, or Firm*—James R. Duzan; John H. Tregoning

[57] ABSTRACT

A seal assembly for a conduit connection including a first and a second conduit part, each having an axially extending flow passage and an end surface radially intersecting the flow passage. Each of the conduit parts includes an internal sealing cavity adjacent the end surface and radially off-set from the flow passage. A composite annular seal is interposed between the conduit parts and extends into the two sealing cavities. The composite annular seal includes a central rim portion from which extend two generally axially disposed lip portions projecting oppositely outwardly into the conduit sealing cavities, each lip portion having an annular groove therein. An elastomeric sealing member having a portion which mates with the annular groove in the lip portion of the composite sealing ring extends peripherally about each end of the lip portions and into conforming engagement with the internal sealing surfaces of the conduit parts. A clamping assembly is positioned about the conduit parts to draw them together and force the elastomeric sealing members to redistribute their volume and conformingly engage the internal conduit sealing surfaces.

4 Claims, 4 Drawing Figures

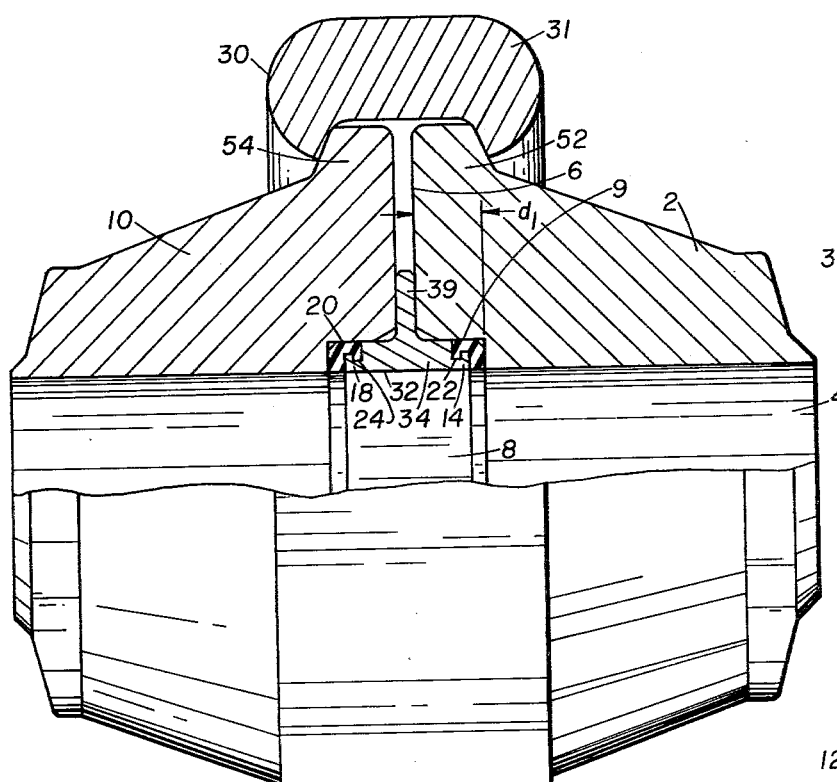
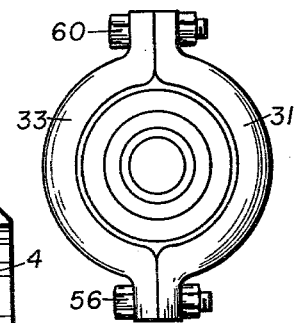
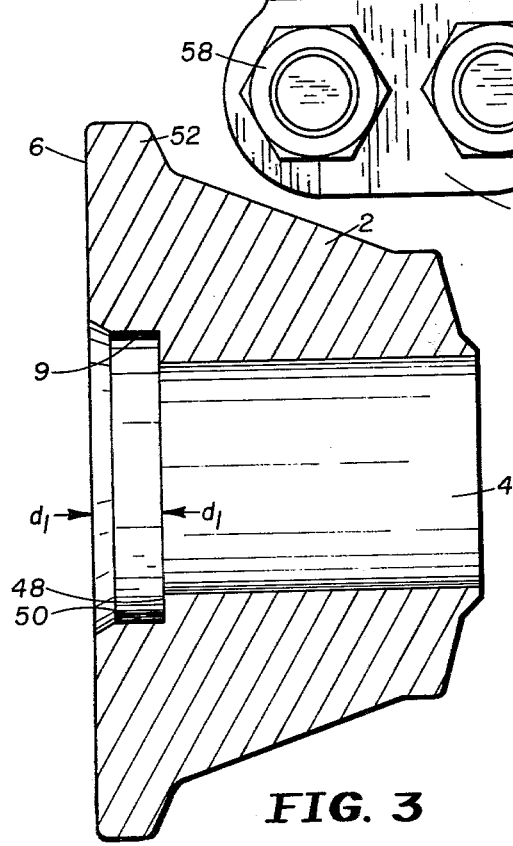
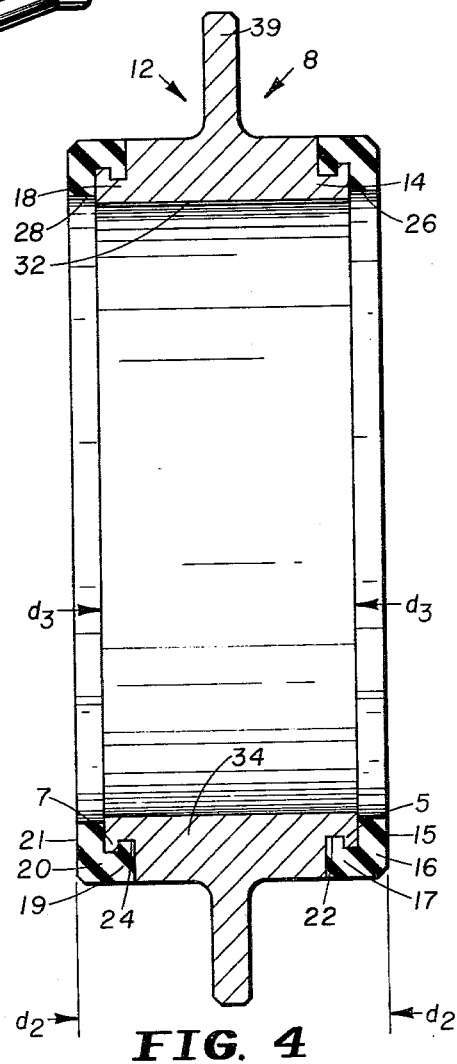
FIG. 1
FIG. 2
FIG. 3
FIG. 4

REPAIRABLE COMPOSITE SEAL RING

BACKGROUND OF THE INVENTION

This is a continuation-in-part of application Ser. No. 873,180, filed Jan. 30, 1978, and now abandoned.

This invention relates to an improved seal assembly in a conduit connection. More specifically, this invention relates to an improved composite annular seal comprising a relatively hard internal annular portion on which is removably mounted a flowable elastomeric material, the composite annular seal being adapted to be removably interposed between adjacent conduit parts.

When conducting fluid flow along a conduit, it has been the practice to releasably join conduit sections in order to provide a fluid flow conduit path of any desired length. However, to prevent fluid leakage at the conduit joints a suitable form of sealing unit must be provided between adjacent conduit sections. To obtain a positive leak proof seal, it is necessary to force the seal member into positive engagement with the internal sealing surfaces of the conduit parts to be joined.

While the magnitude of the force applied to the seal must be sufficient to obtain positive sealing engagement with the sealing surfaces of the conduit parts, it cannot be so large in magnitude as to detrimentally affect the seal. To reduce the likelihood of damaging the seal with excess pressure than forces the seal into engagement with the conduit, it has become necessary to employ seal rings of a substantially hard material such as steel.

One prior art seal of this type includes a seal ring from which oppositely disposed flexible sealing lips extend in a generally axial direction. The seal ring is interposed between two adjacent conduit parts which are drawn together by a clamping arrangement. As the clamping arrangement is tightened, the flexible lips are deflected radially inwardly of the conduit by mating internal conduit sealing surfaces. In the prior art device, an external rib portion extends radially outwardly from the seal ring and is engaged by opposed end faces of the conduit parts that are drawn together.

Although seals of this type are generally adequate, they often prove unsatisfactory to use for a number of reasons. For example, since the flexible sealing lips are made of a generally incompressible material such as steel, small voids exist between the sealing lips and the internal sealing surfaces of the conduit parts thereby creating leakage paths through the seal which are detrimental to the seals and conduit because of the destructive cutting action of small streams of high pressure fluid.

Another disadvantage of the prior art resides in the radial inward deflection of the flexible sealing lips with respect to the conduit parts. If the inward radial deflection of the flexible sealing lips is such that a diametral change in the flow path occurs at the point of the seal, such a diametral change in the flow path creates fluid turbulence at the conduit joint which, when highly abrasive fluids are present, can dramatically increase erosion of the conduit joint.

Another type of prior art seal of this type, which is described in U.S. Pat. No. 3,554,581 and assigned to the assignee of the present invention, includes a composite seal ring from which oppositely disposed lips extend in a generally axial direction having an elastomeric sealing members bonded thereto and engaging flexible sealing flanges extending oppositely outwardly from the central rim of the composite seal ring. The seal ring is interposed between two adjacent conduit parts which are drawn together by a clamping arrangement. As the clamping arrangement is tightened, the elastomeric sealing members are forced into engagement with and conform to the sealing surfaces of the conduit thereby forcing a redistribution of the volume of the elastomeric sealing members. At the same time as the redistribution of the volume of the elastomeric sealing members, the clamping assembly draws the conduit parts further together to cause the portions of the elastomeric members engaging the flexible sealing flanges to redistribute their volume and force the flexible flanges radially outwardly into sealing engagement with the internal conduit sealing surfaces.

Although these prior art seals are adequate, they sometimes prove unsatisfactory in service for a number of reasons. For instance, the flexible sealing flanges are difficult to machine and are easily damaged during handling of the composite seal ring. Also, since the elastomeric members must be bonded to the metallic portion of the composite seal ring to be retained thereon during handling and use, if the elastomeric portions of the composite seal ring are damaged or worn and must be replaced, the composite seal rings must be returned to the manufacturer for repair rather than being repaired in the field. Furthermore, since the elastomeric members are secured to the metallic portion of the composite seal ring by bonding, the composite seal rings are expensive to manufacture requiring a different mold to be used for the bonding of each size elastomeric members on composite seal ring and expensive to repair since it is difficult to remove the elastomeric members from the composite seal ring to mold another thereon.

In contrast to the prior art, a preferred embodiment of the invention comprises a composite annular seal having an easily repairable elastomeric member which is suitable for use at high pressures and flow rates in conduits. The sealing ring includes an annular central rim portion from which two oppositely disposed lip portions extend axially outwardly. An elastomeric sealing member is mounted in an annular groove about each of the lip portions. The elastomeric material is adapted to be forced to conformingly contact internal sealing surfaces of the conduit parts when the composite annular seal is interposed therebetween.

To align the conduit parts with respect to the sealing ring, rib means, extending generally radially outwardly from the central rim portions, is employed. The rib means acts as an alignment member by contacting opposing end faces of the conduit parts and thereby insuring a minimum of diametral or directional change at the conduit joint.

When a selectively operable connecting means is in contact with the conduit parts to be joined and operatively draws them together, the elastomeric material on the composite sealing ring conformingly contacts the internal sealing surfaces of the conduits and forms the sole sealing surface therewith since the elastomeric material on the composite annular seal is subjected to a volume redistribution by the conduit members thereby filling small voids between the composite sealing ring and conduit members.

In this connection, since the internal diameter of the composite sealing ring and the diameter of the elastomeric portions of the composite annular seal are sized such that when the conduit members are joined the flow passage diameters of the conduit members and composite sealing ring are substantially the same thereby reducing the possibility of creating turbulence at the conduit joint.

A seal assembly constructed in accordance with a preferred embodiment of the invention is illustrated in the accompanying drawings in which:

FIG. 1 is a partial cross-sectional side view of a seal assembly according to a preferred embodiment of the present invention;

FIG. 2 is an end view of the seal assembly shown in FIG. 1 taken along the line 2—2 therein;

FIG. 3 is a cross-sectional side view of one of the conduit parts shown in FIG. 1; and FIG. 4 is a cross-sectional view on an enlarged scale of the composite sealing member shown in FIG. 1 with the seal shown before insertion into the conduit parts.

Referring to FIG. 1 of the drawings, a seal assembly according to a preferred embodiment of the invention is shown.

The assembly includes a first conduit part 2 having an axially extending flow passage 4 which is radially intersected by an end face 6. Adjacent the end face, the conduit is provided with a sealing cavity 9 that is radially offset with respect to the flow passage 4.

A composite annular seal 8, shown in detail in FIG. 4, is interposed between the conduit part 2 and a substantially identical but mirror image disposed, second conduit part 10. The composite seal 8 includes a central annular sealing ring 12 from which a generally axially extending first lip portion 14 projects into a sealing cavity 9 of the conduit part 2. A first elastomeric seal member 16 extends peripherally about the lip portion 14 and conformingly engages the conduit part 2 in the sealing cavity 9. A second generally axially extending lip portion 18 and a second elastomeric sealing member 20 similarly extend into the second conduit part 10.

As further shown in FIG. 1, positioned about conduit parts 2 and 10 is a clamping assembly 30 that is operative to draw the conduit parts together. Upon drawing of the conduit parts 2 and 10 together, the elastomeric members 16 and 20 are caused to redistribute their volumes and take up any small voids between the elastomeric and the internal sealing surfaces of the conduits thereby forming the sole sealing surfaces between the composite annular seal 8 and conduits 2 and 10.

As shown in FIG. 4, the composite annular ring 8 comprises a central annular sealing ring 12 of relatively hard material such as machined metal or the like and elastomeric sealing means 16 and 20. The annular sealing ring 12 includes a cental rim portion 34 and axially disposed lip portions 14 and 18. The lip portions 14 and 18 have annular grooves 22 and 24 therein respectively which, in turn, are formed having reduced diameter outer wall portions 5 and 7 respectively. Extending about these annular grooves 22 and 24 are elastomeric sealing means 16 and 20 respectively. The elastomeric sealing means 16 and 20 have annular lugs 17 and 19 respectively which mate with the annular grooves 22 and 24 of the central annular sealing ring 12. The elastomeric sealing means 16 and 20 are retained on the annular sealing ring 12 and prevented from axial movement outwardly on the annular sealing ring 12 by the lugs 17 and 19 of the elastomeric sealing means 16 and 20 respectively engaging the reduced diameter outer wall portions 5 and 7 of the annular grooves 22 and 24 respectively. To install the elastomeric sealing means 16 and 20 on the annular sealing ring 12, a portion of the lug on each elastomeric sealing means is inserted into the annular groove on the annular sealing ring and the elastomeric sealing means is stretched until the remaining portion of the lug on the elastomeric sealing means is inserted, i.e., snapped, into the annular groove.

The elastomeric members 16 and 20 are formed from any suitable elastomeric material, such as BUNA-N type rubber. The particular material for the elastomeric sealing means is not critical, and it is only necessary that the material be such to flow slightly when compressive forces are exerted on it and resilient to allow installation of the elastomeric sealing means by snapping the lug of the elastomeric sealing means into its respective annular groove in the central annular sealing ring.

As shown in FIG. 3, the internal sealing surfaces of the conduit part 2 are formed in the previously mentioned internal sealing cavity 9 by a radially extending, annular internal sealing shoulder 48 which intersects an axially extending, annular internal sealing shoulder 50. For subsequent usage, the total internal axial length $d_1$ of the conduit part 2, from the sealing shoulder 48 to the end face 6, is greater than the axial extent $d_3$ of the lip portion, but is less than the axial length $d_2$ of the seal member 8 when the elastomeric means is in its free, uncompressed state. The internal sealing cavity of the conduit part 10 is similarly defined.

The peviously mentioned clamping assembly 30 includes two clamp pieces 31 and 33 mounted about the conduit parts 2 and 10 in engagement with a first and second projection 52 and 54 formed on the radially outermost portions of the conduit parts 2 and 10 respectively. The assembly may be tightened to draw the conduit parts together by the conventional draw bolts 56, 58 and 60. Alternatively, the clamping arrangement shown could be replaced by inserting bolts through the projections 52 and 54 for quick disconnect service, or by any other structure that will enable an operator to pull the two conduits together and hold them.

When the composite seal 8 is interposed between the adjacent conduit parts 2 and 10, drawing pressure provided by the clamp assembly 30 will cause the elastomeric members 16 and 20 to flow slightly and fill small voids between the elastomeric members and the internal sealing shoulders 48 and 50 (FIG. 3) of the conduit. This flowing is caused by compression of the elastomeric members by the conduit parts 2 and 10 because the previously mentioned conduit axial dimension $d_1$ is less than the axial lengths $d_2$ defined by the axial extent of lip portions 14 and 18 and the axially outermost portions 15 and 21 of the elastomeric members.

It should be noted that the elastomeric seal means 16 and 20 are formed with diameters 26 and 28 respectively of slightly larger diameter than internal diameter 32 of the central annular sealing ring 12 thereby allowing a portion of the elastomeric material to flow inwardly when the elastomeric seal means volume is redistributed upon drawing pressure being exerted by the clamp assembly 30. However, the elastomeric material of the sealing means does not flow sufficiently to extend into the flow path to cause turbulence.

In order to reduce the possibility of undersirable diametrical or directional changes at the conduit joint, the central sealing ring 12 is provided with an alignment member 39. Member 39 extends generally axially outwardly from the central rim portion 34, and contacts the opposing end faces 6 of the conduit parts when they are drawn together by the clamp assembly 30. In this way, the conduit parts 2 and 10 are aligned with respect to the composite sealing ring 8.

If an alignment member 39 is not included in the seal 8, then it is not necessary for the conduit dimension $d_1$ to be less than the seal dimension $d_2$. In this case the overall axial dimension of the seal, when the elastomer is uncompressed, should be greater than the distance between the internal sealing shoulders 48 of the conduit parts 2 and 10 when they are joined, in order for compression to occur. Furthermore, in order to provide an escape route for the elastomer, the distance between the shoulders 48 when the conduit parts are joined should be greater than the overall axial extent of the lip portions of the seal.

It will be appreciated that the composite annular seal 8 is particularly adapted for use in high pressure fluid flow lines such as discharge liners for fracturing work. The central sealing ring 12 provides the desirable characteristics of a substantially rigid sealing member while the elastomeric sealing members 16 and 20 minimize the problem caused by the fact that rigid sealing members, as shown in the prior art, do not always conformingly engage with surfaces to be sealed. In contrast to the prior art, the composite annular seal 8 of the present invention has as its sole sealing surfaces with respect to the conduits 2 and 10, the elastomeric members 16 and 20 which engage surfaces 48 and 50 of the conduits 2 and 10 to form effective high pressure sealing surfaces therewith. The alignment member 39 cannot be relied upon to form any effective high pressure sealing surface with end faces 6 of the conduits 2 and 10 since, with continued use of the composite annular seal 8 and conduits 2 and 10, the end faces 6 and alignment member 39 are damaged or worn so that conforming engagement therebetween is prevented. Similarly, the outer peripheral surface of the central annular sealing ring 12 of the composite annular ring 8 does not conformingly contact the sealing shoulders 50 of the conduits 2 and 10 upon assembly of the composite annular ring 8 therebetween since the composite annular ring 8 is of slightly less diameter than the diameter of sealing shoulders 50 of the conduits 2 and 10 to permit the ready assembly and disassembly of the composite annular ring 8 and conduits 2 and 10.

OPERATION AND METHOD OF ASSEMBLY

To assemble the seal unit of the present invention, composite seal 8 is first inserted into the sealing cavity 9 of the conduit part 2. Because of the dimensions of the seal 8, the elastomeric member 16 will contact the sealing shoulder 48 of the conduit sealing cavity before the rib means 39 of the seal contacts the end face 6 of the conduit. Next, conduit part 10 is slipped over the exposed end of the seal 8 until its internal sealing shoulder bottoms on the elastomeric member 20. The clamping assembly 30 is then placed into engagement with the projections 52 and 54 on the conduit parts. An initial drawing force provided by the clamping assembly 30 exerts compressive longitudinal forces on the elastomer, causing it to flow slightly and fill any small voids previously existing between the internal sealing surfaces of the conduits and the elastomeric members 16 and 20. Any further force tending to draw the conduit parts 2 and 10 together causes the elastomer to further redistribute its volume because of the increased longitudinal compressive forces. Rib means 39 acts as an alignment member for the conduit parts with respect to the composite seal 8.

SUMMARY OF ADVANTAGES

It will be seen that in following the present invention, a seal assembly which is particularly effective in fluid flow line connections is provided.

Of particular significance is the provision of a leak proof seal with both the strength and rigidity of a relatively hard seal member and having the added advantage of minimizing the possibility of any voids occurring between an elastomeric seal and its mating conduit surfaces.

Other advantages are provided by the alignment rib means which aligns the conduit parts with respect to the seal member.

Furthermore, all sealing surfaces of the conduit parts are in a female cavity and will not be subjected to damage during handling.

A particular advantage in the method of assembling the seal unit of the present invention is the insurance of a fail-safe, leak-proof seal by drawing the conduit parts together to cause the elastomer to conformingly engage the internal conduit sealing surfaces.

Another important advantage of the improved composite seal results in the easy installation and removal of the elastomeric sealing means on the central sealing ring thereby allowing repair of the composite sealing ring by hand.

Yet another significant advantage of the improved composite annular seal results in lower manufacturing cost of the central annular sealing ring since it is only necessary to machine an annular groove having a reduced diameter outer wall portion in each lip portion which groove is not easily damaged during handling of the central annular sealing ring.

We claim:

1. A composite annular seal adapted to be interposed between two opposed conduit parts and to mate with the internal surfaces of the conduit parts when the conduit parts are in an assembled relationship, the composite annular seal comprising:

an annular member of relatively hard material including a central rim portion having two generally axially disposed annular lip portions extending longitudinally oppositely outwardly from said central rim portion, each of said lip portions having one end connected to the central rim and having an annular groove therein adjacent the other end of the annular lip portion formed having a reduced diameter outer wall portion which is of a diameter less than the external diameter of said lip portions, having a bottom wall portion and having a wall portion adjacent the central rim, whereby the internal surfaces of the central rim portion and the lip portions define a continuous cylindrical surface having a substantially constant diameter while the external diameters of the lip portions are substantially equal, and deformable sealing means extending continuously peripherally about each of said lip portions and having an annular lug removably engaging the annular groove in each of the lip portions to secure the deformable sealing means to each of the lip portions solely by the engagement of the annular lug with the annular groove and having an end surface abutting the wall portion of the annular groove adjacent the central rim portion, the deformable sealing means formed having the smallest internal diameter thereof being larger than the diameter of the internal surfaces of the lip portions, formed having the internal diameter of the annular lug engaging the annular groove in each lip portion substantially equal to the diameter of the bottom wall portion of the annular groove, and formed having the external diameter thereof being substantially equal to the external diameter of the lip portions, the deformable sealing means being adapted to conformingly contact the internal surfaces of the conduit parts when the conduit parts are in an assembled relationship with said composite annular seal interposed therebetween by the end surfaces of the deformable sealing means contacting portions of the conduits thereby compressing the deformable seal means between the portion of the conduit and the wall portion of the annular groove in the lip portion adjacent the central rim portion until the deformable portion flows to sealingly engage said conduit parts and said composite annular seal whereby a seal is formed solely by the deformable sealing means engaging portions of said conduit parts.

2. A composite annular seal as defined in claim 1 wherein said annular member further includes,
   rib means, extending generally radially outwardly from said central rim portion, adapted to contact opposing end faces of the conduit parts to align the conduit parts with respect to said composite annular seal.

3. A seal assembly comprising:
   first and second conduit parts, each of said conduit parts including:
   an axially extending flow passage,
   an end surface radially intersecting said flow passage, and
   an internal sealing surface adjacent said end surface and extending radially outwardly from said flow passage,
   said end surfaces being oppositely disposed,
   a composite annular seal interposed between said first and second conduit parts, said composite annular seal comprising:
   a central rim portion having two generally axially disposed annular lip portions extending longitudinally oppositely outwardly from said central rim portion, each of said lip portions having one end connected to the central rim portion and having an annular groove therein adjacent the other end of the annular lip portion formed having a reduced diameter outer wall portion which is of a diameter less than the external diameter of said lip portions, having a bottom wall portion and having a wall portion adjacent to the central rim portion;
   whereby the internal surfaces of the central rim portion and the lip portions define a continuous cylindrical surface having a substantially constant diameter while the external diameter of the lip portions are substantially equal, and
   deformable sealing means extending continuously peripherally about each of said lip portions and having an annular lug removably engaging the annular groove in each of the lip portions to secure the deformable sealing means to each of the lip portions solely by the engagement of the annular lug with the annular groove and having an end surface abutting the wall portion of the annular groove adjacent the central rim portion, the deformable sealing means formed having the smallest internal diameter thereof being larger than the diameter of the internal surfaces of the lip portions, formed having the internal diameter of the annular lug engaging the annular groove in each lip portion substantially equal to the diameter of the bottom wall portion of the annular groove, and formed having the external diameter thereof being substantially equal to the external diameter of the lip portions, the deformable sealing means being adapted to conformingly contact the internal surfaces of the conduit parts when the conduit parts are in an assembled relationship with said composite annular seal interposed therebetween; and
   selectively operable connecting means for drawing said conduit parts toward one another to cause said deformable sealing means to be forced to conformingly contact said internal sealing surfaces by the length of said composite annular seal interposed between said first and second conduit parts being greater than distance between the internal sealing surfaces of said first and second conduit parts when said first and second conduit parts are in an assembled relationship thereby causing said first and second conduit parts to compress the deformable sealing means into engagement with the internal sealing surfaces thereof forming the sole sealing surfaces of said seal assembly.

4. The seal assembly as defined in claim 3 wherein said annular member includes:
   rib means, extending generally radially outwardly from said central rim portion, adapted to contact opposing end faces of the conduit parts with respect to said composite annular seal.

* * * * *